United States Patent
Wang et al.

(10) Patent No.: US 9,203,298 B2
(45) Date of Patent: Dec. 1, 2015

(54) THREE-PHASE INTERLEAVE CONVERTER WITH THREE-STATE SWITCHING CELL

(71) Applicant: Huawei Technologies Co., Ltd., Shenzhen, Guangdong (CN)

(72) Inventors: Shaohua Wang, Shenzhen (CN); Zhikai Wen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 79 days.

(21) Appl. No.: 14/087,700

(22) Filed: Nov. 22, 2013

(65) Prior Publication Data

US 2014/0112034 A1 Apr. 24, 2014

Related U.S. Application Data

(63) Continuation of application No. PCT/CN2013/074943, filed on Apr. 28, 2013.

(30) Foreign Application Priority Data

Oct. 23, 2012 (CN) .......................... 2012 1 0407280

(51) Int. Cl.
- *H02M 1/12* (2006.01)
- *H02M 1/42* (2007.01)
- *H02M 1/44* (2007.01)
- *H02M 7/06* (2006.01)

(52) U.S. Cl.
CPC ............ *H02M 1/4216* (2013.01); *H02M 1/126* (2013.01); *H02M 1/4225* (2013.01); *H02M 1/44* (2013.01); *H02M 7/06* (2013.01); *H02M 2001/123* (2013.01); *Y02B 70/126* (2013.01)

(58) Field of Classification Search
CPC ........... H02M 1/12; H02M 1/14; H02M 7/06; H02M 1/4225; H02H 7/127
USPC .............. 363/39, 40, 44, 47, 48, 52, 126; 323/205, 207
See application file for complete search history.

(56) References Cited

U.S. PATENT DOCUMENTS

| | | | | |
|---|---|---|---|---|
| 8,325,501 | B2* | 12/2012 | Torrico-Bascope | 363/47 |
| 8,395,913 | B2* | 3/2013 | Torrico-Bascope | 363/47 |
| 8,503,199 | B1* | 8/2013 | Chapuis et al. | 363/37 |
| 2004/0160789 | A1 | 8/2004 | Ying et al. | |
| 2010/0182100 | A1 | 7/2010 | Tucker | |
| 2011/0141774 | A1 | 6/2011 | Kane et al. | |
| 2011/0286249 | A1 | 11/2011 | Torrico-Bascope | |
| 2012/0286740 | A1 | 11/2012 | Loudot et al. | |

FOREIGN PATENT DOCUMENTS

| | | |
|---|---|---|
| CN | 101001051 A | 7/2007 |
| CN | 101860192 A | 10/2010 |
| CN | 101897109 A | 11/2010 |
| CN | 101959711 A | 1/2011 |
| CN | 102307009 A | 1/2012 |
| CN | 102405588 A | 4/2012 |
| CN | 102931817 A | 2/2013 |
| EP | 2422441 A1 | 2/2012 |
| WO | WO 2009046762 A1 | 4/2009 |
| WO | WO 2010103063 A1 | 9/2010 |
| WO | WO 2011147117 A1 | 12/2011 |

* cited by examiner

*Primary Examiner* — Adolf Berhane
(74) *Attorney, Agent, or Firm* — Leydig, Voit & Mayer, Ltd.

(57) ABSTRACT

A three-phase interleave converter with a TSSC includes: a filter circuit, a PFC circuit, a star connection between the filter circuit and the PFC circuit, and a second capacitor 7; where an output end of the filter circuit is connected to an input end of the PFC circuit by using a conducting wire; the star connection is set on the conducting wire connecting the filter circuit and the PFC circuit; one end of the star connection is connected to the conducting wire and the other end of the star connection is connected to one end of the second capacitor 7; and the other end of the second capacitor 7 is connected to an input wire. By using the foregoing solution, the number of capacitors is reduced from the original three to one. Therefore, fewer capacitors are used, and the volume is further reduced, thereby increasing the power density.

3 Claims, 5 Drawing Sheets

US 9,203,298 B2

THREE-PHASE INTERLEAVE CONVERTER WITH THREE-STATE SWITCHING CELL

CROSS-REFERENCE TO RELATED APPLICATIONS

This application is a continuation of International Patent Application No. PCT/CN2013/074943, filed on Apr. 28, 2013, which claims priority to Chinese Patent Application No. 201210407280.9, filed on Oct. 23, 2012, both of which are hereby incorporated by reference in their entireties.

TECHNICAL FIELD

The present invention relates to the field of electronic technologies, and in particular, to a three-phase interleave converter with a three switching state cell.

BACKGROUND

To reduce an Electro Magnetic Compatibility (EMC) common-mode interference, a current three-phase interleave converter with a Three-State Switching Cell (TSSC) is connected, using three safety capacitors (Y2 capacitors), to a wire and a Power Factor Correction (PFC) bus voltage to reduce common-mode interference.

A three-phase interleave converter with a three-state switching cell illustrated in FIG. 1 includes a filter circuit and a power factor correction circuit. Three safety capacitors (Y2 capacitors) are set in a conducting wire connecting the filter circuit to the power factor correction circuit, namely, Cx7, Cx8, and Cx9, where one end of the Cx7, one end of the Cx8, and one end of the Cx9 are connected together and the other ends are connected to the conducting wire. In addition, a star connection is also set in the conducting wire connecting the filter circuit to the power factor correction circuit. The Y2 capacitor is a type of safety capacitor specified by the International Electrotechnical Commission (IEC) 644 and is bridge-connected between the live wire or neutral wire of an electrical power, and the ground, where the basic insulation or supplementary insulation voltage ranges from 150 V to 250 V.

Because the rectifier modules are constantly miniaturized and achieving higher and higher efficiency, and the EMC filters are space-consuming, it is a good way to reduce the number of the EMC filters by increasing the power density of the module. In the circuit illustrated in FIG. 1, three Y2 capacitors are needed; the use of three safety capacitors (Y2 capacitors) is space-consuming and requires a lot of devices, which is unfavorable to improvement of the power density.

SUMMARY

Embodiments of the present invention provide a three-phase interleave converter with a three-state switching cell to reduce utilization of capacitors and further decrease the volume and increase the power intensity.

A three-phase interleave converter with a three-state switching cell includes: a filter circuit, a power factor correction circuit, a star connection between the filter circuit and the power factor correction circuit, and a second capacitor 7, where an output end of the filter circuit is connected to an input end of the power factor correction circuit by using a conducting wire; the star connection is set on the conducting wire connecting the filter circuit to the power factor correction circuit; one end of the star connection is connected to the conducting wire and the other end of the star connection is connected to one end of the second capacitor 7; and the other end of the second capacitor 7 is connected to an input wire.

According to the foregoing technical solution, the embodiments of the present invention have the following merits: The three-phase interleave converter with TSSC provided in the solution needs one capacitor only, with the number of capacitors being reduced from the original three to one. In this way, fewer capacitors are used, and the volume is further reduced, thereby increasing the power density.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some the embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention more comprehensible, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
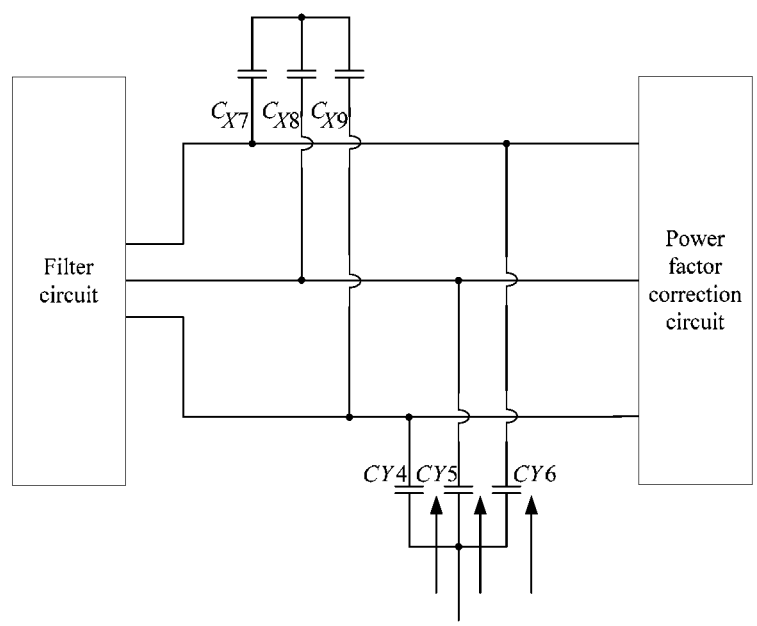
FIG. 1 is a schematic structural diagram of a three-phase interleave converter with a three-state switching cell in the prior art.
Figure 2:
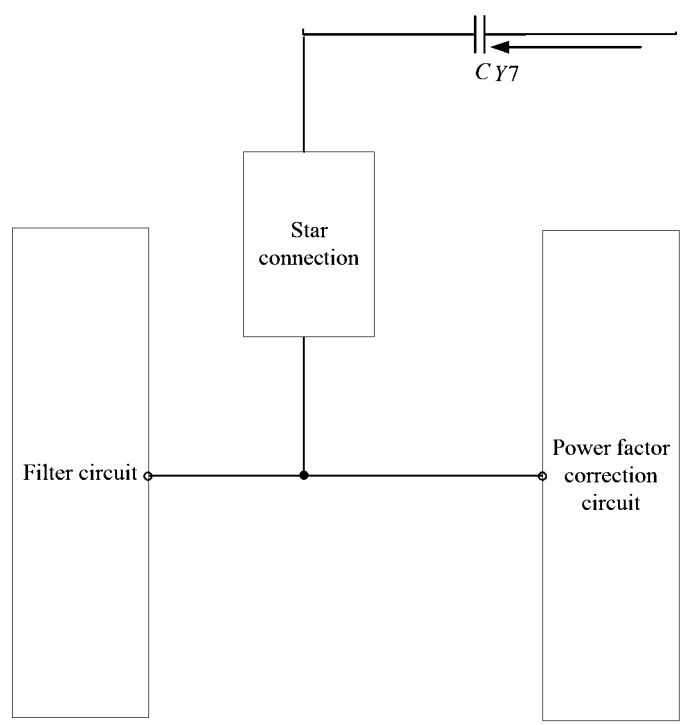
FIG. 2 is a schematic structural diagram of a three-phase interleave converter with a three-state switching cell according to an embodiment of the present invention.

An embodiment of the present invention provides a three-phase interleave converter with a three-state switching cell. As shown in FIG. 2, the three-phase interleave converter with a three-state switching cell includes:

a filter circuit, a power factor correction circuit, a star connection between the filter circuit and the power factor correction circuit, and a second capacitor 7 Cy7.

An output end of the filtering circuit and an input end of the power factor correction circuit are connected by using a conducting wire; the star connection is set on the conducting wire connecting the filter circuit and the power factor correction circuit; one end of the star connection is connected to the conductor and the other end of the star connection is connected to one end of the second capacitor 7 (Cy7); and the other end of the second capacitor 7 (Cy7) is connected to an input wire.

Figure 3:
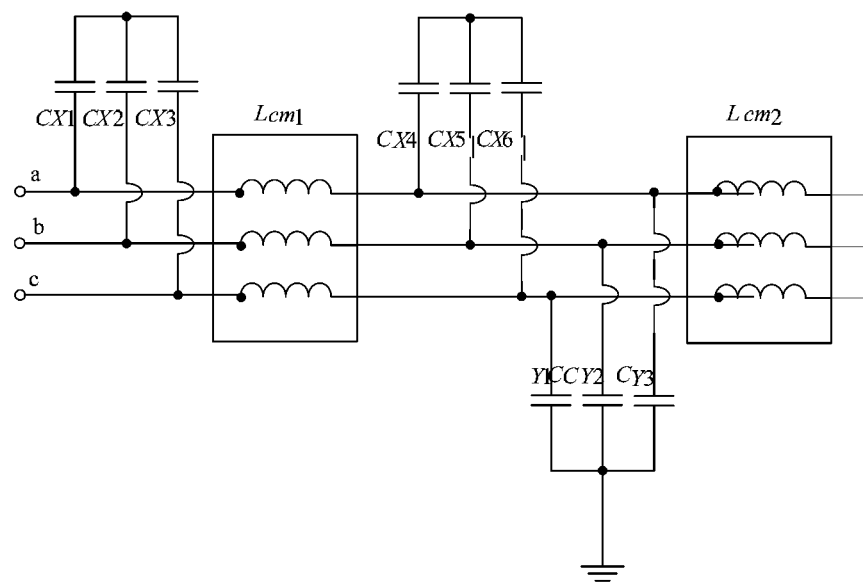
FIG. 3 is a schematic structural diagram of a filter circuit according to an embodiment of the present invention.
Figure 4:
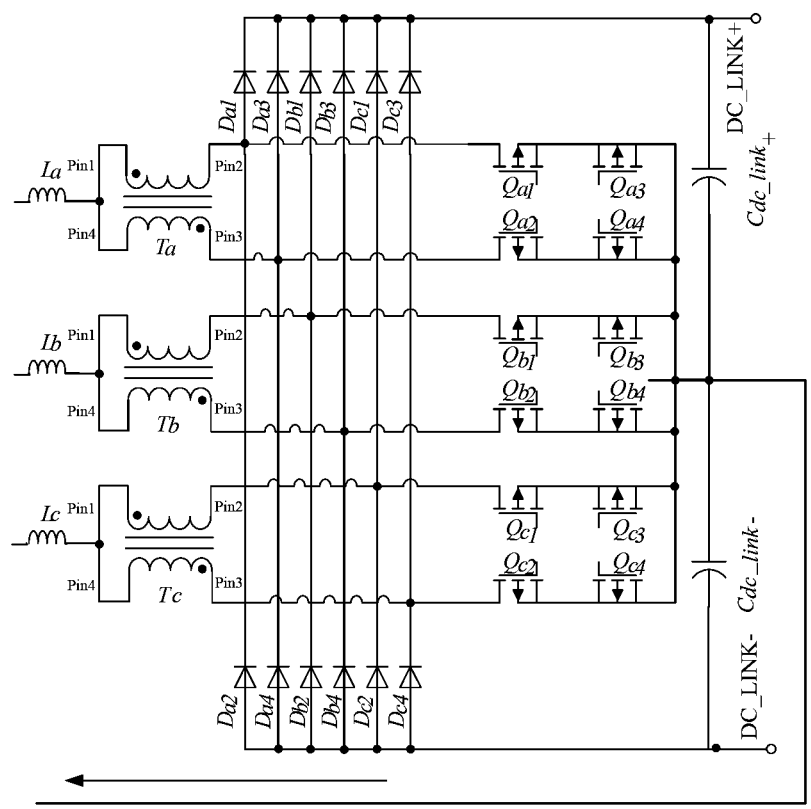
FIG. 4 is a schematic structural diagram of a PFC circuit according to an embodiment of the present invention.

For details of the filter circuit and the power factor correction circuit provided in the foregoing embodiment, reference may be made to FIG. 3 and FIG. 4. It should be noted that the filter circuit and the PFC circuit illustrated in FIG. 3 and FIG. 4 are only examples of these two types of circuits. It is understandable by those skilled in the art that there are still a lot of filter circuits and PFC circuits, and FIG. 3 and FIG. 4 should not be understood as a definite limitation to the filter circuit and the PFC circuit mentioned in this application. The star connection is a functional circuit connecting the filter circuit and the PFC circuit. The specific structure of the star connection is not limited in the embodiment of the present invention.

In the foregoing solution, the three-phase interleave converter with TSSC needs to use one capacitor only, and reduces the number of capacitors from the original three to one. In this way, fewer capacitors are used, and the volume is further reduced, thereby increasing the power density.

Alternatively, as shown in FIG. 3, the filter circuit includes: three pins of an input end of the filter circuit: a first pin a, a second pin b, and a third pin c, nine capacitors: a first capacitor 1 Cx1, a first capacitor Cx2, a first capacitor 3 Cx3, a first capacitor 4 Cx4, a first capacitor 5 Cx5, a first capacitor 6 Cx6, a second capacitor 1 Cy1, a second capacitor 2 Cy2, and a second capacitor 3 Cy3, and two common-mode inductors: a first common-mode inductor Lcm1 and a second common-mode inductor Lcm2.

The first pin a, the second pin b, and the third pin c act as pins of the input end of the filter circuit to connect to a three-phase power supply and are connected to the first common-mode inductor Lcm1.

The first common-mode inductor Lcm1 and the second common-mode inductor Lcm2 are connected in series.

One end of the first capacitor 1 Cx1, one end of the first capacitor 2 Cx2, and one end of the first capacitor 3 Cx3 are connected together, and the other ends thereof are connected to the first common-mode inductor Lcm1.

One end of the first capacitor 4 Cx4, one end of the first capacitor 5 Cx5, and one end of the first capacitor 6 Cx6 are connected together, and the other ends thereof are connected to a joint between the first common-mode inductor Lcm1 and the second common-mode inductor Lcm2.

One end of the second capacitor 1 Cy1, one end of the second capacitor 2 Cy2, and one end of the second capacitor 3 Cy3 are connected together and connected to a protecting earthing PE, and the other ends thereof are connected to the joint between the first common-mode inductor Lcm1 and the second common-mode inductor Lcm2; and an output end of the second common-mode inductor Lcm2 is an output end of a rectifier circuit.

Alternatively, as shown in FIG. 4, the power factor correction circuit includes: three inductors: a first inductor La, a second inductor Lb, and a third inductor Lc, three autotransformers: a first autotransformer Ta, a second autotransformer Tb, and a third autotransformer Tc, twelve diodes: a first diode 12 Da1, a first diode 22 Da2, a first diode 32 Da3, a first diode 42 Da4, a second diode 12 Db1, a second diode 22 Db2, a second diode 32 Db3, a second diode 42 Db4, and a third diode 12 Dc1), a third diode 22 Dc2, a third diode 32 Dc3, a third diode 42 Dc4, twelve switch transistors: a first switch transistor 1 Qa1, a first switch transistor 2 Qa2, a first switch transistor 3 Qa3, a first switch transistor 4 Qa4, a second switch transistor 1 Qb1, a second switch transistor 2 Qb2, a second switch transistor 3 Qb3, a second switch transistor 4 Qb4, and a third switch transistor 1 Qc1, a third switch transistor 2 Qc2, a third switch transistor 3 Qc3, a third switch transistor 4 Qc4, two capacitors: a first capacitor Cdc_link+ and a second capacitor Cdc_link−, where the autotransformers have four pins: a first autotransformer pin Pin1, a second autotransformer pin Pin2, a third autotransformer pin Pin3, and a fourth autotransformer pin Pin4.

The first inductor La, the second inductor Lb, and the third inductor Lc, and the second common-mode inductor Lcm2 are connected in series to act as an input end of the power factor correction circuit.

Their respective first autotransformer pins Pin1 of the first autotransformer Ta, the second autotransformer Tb, and the third autotransformer Tc are connected to their respective fourth autotransformer pins Pin4, and both the first autotransformer pin Pin1 and the fourth autotransformer pin Pin4 of each of the first autotransformer Ta, the second autotransformer Tb, and the third autotransformer Tc are connected to the first inductor La, the second inductor Lb, and the third inductor Lc in series, respectively.

The first diode 12 Da1 and the first diode 22 Da2 are connected in series, and the second autotransformer pin Pin2 of the first autotransformer Ta is connected to a connecting point between the first diode 12 Da1 and the first diode 22 Da2.

The first diode 32 Da3 and the first diode 42 Da4 are connected in series, and the third autotransformer pin Pin3 of the first autotransformer Ta is connected to a connecting point between the first diode 32 Da3 and the first diode 42 Da4.

The second autotransformer pin Pin2 of the second autotransformer Tb is connected to a connecting point between the second diode 12 Db1 and the second diode 22 Db2.

The second diode 32 Db3 and the second diode 42 Db4 are connected in series, and the third autotransformer pin Pin3 of the second autotransformer Tb is connected to a connecting point between the second diode 32 Db3 and the second diode 42 Db4.

The second autotransformer pin Pin2 of the third autotransformer Tc is connected to a connecting point between the third diode 12 Dc1 and the third diode 22 Dc2; the third diode 32 Dc3 and the third diode 42 Dc4 are connected in series, and the third autotransformer pin Pin3 of the third autotransformer Tc is connected to a connecting point between the third diode 32 Dc3 and the third diode 42 Dc4.

The second autotransformer pin Pin2 of the first autotransformer Ta is connected to a pole D of the first switch transistor 1 Qa1, and a pole S of the first switch transistor 1 Qa1 is connected to a pole S of the first switch transistor 3 Qa3.

The third autotransformer pin Pin3 of the first autotransformer Ta is connected to a pole D of the first switch transistor 2 Qa2, and a pole S of the first switch transistor 2 Qa2 is connected to a pole S of the first switch transistor 4 Qa4.

The second autotransformer pin Pin2 of the Tb is connected to a pole D of the second switch transistor 1 Qb1, and a pole S of the second switch transistor 1 Qb1 is connected to a pole S of the second switch transistor 3 Qb3.

The third autotransformer pin Pin3 of the Tb is connected to a pole D of the second switch transistor 2 Qb2, and a pole S of the second switch transistor 2 Qb2 is connected to a pole S of the second switch transistor 4 Qb4.

The second autotransformer pin Pin2 of the third autotransformer Tc is connected to a pole D of the third switch transistor 1 Qc1, and a pole S of the third switch transistor 1 Qc1 is connected to a pole S of the third switch transistor 3 Qc3.

The third autotransformer pin Pin3 of the third autotransformer Tc is connected to a pole D of the third switch transistor 2 Qc2, and a pole S of the third switch transistor 2 Qc2 is connected to a pole S of the third switch transistor 4 Qc4.

The poles D of the first switch transistor 3 Qa3, the first switch transistor 4 Qa4, the second switch transistor 3 Qb3, the second switch transistor 4 Qb4, the third switch transistor 3 Qc3, and the third switch transistor 4 Qc4 are connected to N.

A negative pole of the first capacitor Cdc_link+ is connected to a neutral wire N, and a positive pole of the first capacitor is connected to an output positive pole DC_LINK+ of the power factor correction circuit.

A positive pole of the second capacitor Cdc_link− is connected to the neutral wire N, and a negative pole of the second capacitor is connected to a negative pole DC_LINK− of the power factor correction circuit.

Anodes of the first diode 12 Da1, the first diode 32 Da3, the second diode 12 Db1, the second diode 32 Db3, the third diode 12 Dc1, and the third diode 32 Dc3 are connected to the output positive pole DC_LINK+ of the power factor correction circuit.

Cathodes of the first diode 22 Da2, the first diode 42 Da4, the second diode 22 Db2, the second diode 42 Db4, the third diode 22 Dc2, and the third diode 42 Dc4 are connected to the output negative pole DC_LINK− of the power factor correction circuit.

Figure 5:
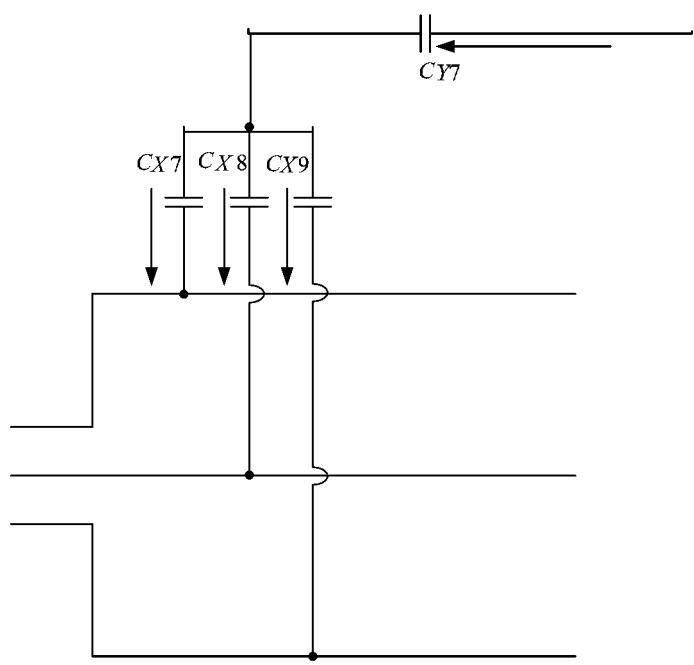
FIG. 5 is a schematic structural diagram of a star connection and a capacitor according to an embodiment of the present invention.

Based on the filter circuit and the PFC circuit illustrated in FIG. 3 and FIG. 4, as shown in FIG. 5, the star connection includes: three capacitors: a first capacitor 7 Cx7, a first capacitor 8 Cx8, and a first capacitor 9 Cx9, where one end of the first capacitor 7 Cx7, one end of the first capacitor 8 Cx8, and one end of the first capacitor 9 are connected to a joint between the second common-mode inductor Lcm2 and the first inductor La, the second inductor Lb, and the third inductor Lc, and the other ends of the first capacitor 7 Cx7, the first capacitor 8 Cx8, and the first capacitor 9 Cx9 are connected together and connected to one end of a second capacitor 7 Cy7, where the other end of the second capacitor 7 Cy7 is connected to the neural N.

In the foregoing solution, a three-phase interleave converter with TSSC needs to use one capacitor only, and reduces the number of original capacitors from three to one. In this way, fewer capacitors are used, and the volume is further reduced, thereby increasing power density.

The foregoing descriptions are merely exemplary specific embodiments of the present invention, but are not intended to limit the protection scope of the present invention. Any variation or replacement readily figured out by a person skilled in the art within the technical scope disclosed in the embodiments of the present invention shall fall within the protection scope of the present invention. Therefore, the protection scope of the present invention shall be subject to the protection scope of the claims.

What is claimed is:

1. A three-phase interleave converter with a three-state switching cell, comprising:
    a filter circuit and a power factor correction circuit, wherein a conducting wire connects an output end of the filter circuit to an input end of the power factor correction circuit;
    a star connection between the filter circuit and the power factor correction circuit, wherein the star connection is connected to the conducting wire; and
    wherein the filter circuit comprises:
        first, second and third pins of an input end of the filter circuit;
        nine capacitors comprising first capacitors 1, 2, 3, 4, 5 and 6 and a second capacitor 7 which includes second capacitors 1, 2 and 3; and
        first and second common-mode inductors,
    wherein the second capacitor 7 is connected at one of its ends to one end of the star connection and connected at another of its ends to an input wire,
    wherein the first, second and third pins act as pins of the input end of the filter circuit to connect to a three-phase power supply and are connected to the first common-mode inductor,
    the first and second common-mode inductors are connected in series,
    one end of each of the first capacitors 1, 2 and 3 is connected in common and another end of each of the first capacitors 1, 2 and 3 is connected to the first common-mode inductor,
    one end of each of the first capacitors 4, 5 and 6 is connected in common and another end of each of the first capacitors 4, 5, and 6 is connected to a joint between the first and second common-mode inductors,
    one end of each of the second capacitors 1, 2 and 3 is connected to a protecting earthing (PE) and another end of each of the second capacitor 1, 2 and 3 is connected to the joint between the first and second common-mode inductors, and
    an output end of the second common-mode inductor is an output end of a rectifier circuit.

2. The three-phase interleave converter with a three-state switching cell according to claim 1, wherein:
    the power factor correction circuit comprises:
    first, second and third inductors, first, second and third autotransformers each having first, second, third and fourth pins, first diodes 1, 2, 3 and 4, second diodes 1, 2, 3 and 4, and third diodes 1, 2, 3 and 4, first switch transistors 1, 2, 3 and 4, second switch transistors 1, 2, 3 and 4 and third switch transistors 1, 2, 3 and 4, and additional first and second capacitors; wherein:
    the first, second and third inductors and the second common-mode inductor are connected in series to act as an input end of the power factor correction circuit;
    the respective first autotransformer pins of the first, second, and third autotransformers are connected to the respective fourth autotransformer pins of the first, second and third autotransformers, and are connected to the first, second and third inductors in serial, respectively;
    the first diode 1 and the first diode 2 are connected in series, and the second autotransformer pin of the first autotransformer is connected to a connecting point between the first diode 1 and the first diode 2;
    the first diode 3 and the first diode 4 are connected in series, and the third autotransformer pin of the first autotransformer is connected to a connecting point between the first diode 32 and the first diode 42;
    the second autotransformer pin of the second autotransformer is connected to a connecting point between the second diode 1 and the second diode 2;
    the second diode 3 and the second diode 4 are connected in series, and the third autotransformer pin of the second autotransformer is connected to a connecting point between the second diode 3 and the second diode 4;
    the second autotransformer pin of the third autotransformer is connected to a connecting point between the third diode 1 and the third diode 2;
    the third diode 3 and the third diode 4 are connected in series, and the third autotransformer pin of the third autotransformer is connected to a connecting point between the third diode 3 and the third diode 4;
    the second autotransformer pin of the first autotransformer is connected to a pole D of the first switch transistor 1, and a pole S of the first switch transistor 1 is connected to a pole S of the first switch transistor 3;
    the third autotransformer pin of the first autotransformer is connected to a pole D of the first switch transistor 2, and a pole S of the first switch transistor 2 is connected to a pole S of the first switch transistor 4;

the second autotransformer pin of the second autotransformer is connected to a pole D of the second switch transistor 1, and a pole S of the second switch transistor 1 is connected to a pole S of the second switch transistor 3;

the third autotransformer pin of the second autotransformer is connected to a pole D of the second switch transistor 2, and a pole S of the second switch transistor 2 is connected to a pole S of the second switch transistor 4;

the second autotransformer pin of the third autotransformer is connected to a pole D of the third switch transistor 1, and a pole S of the third switch transistor 1 is connected to a pole S of the third switch transistor 3;

the third autotransformer pin of the third autotransformer is connected to a pole D of the third switch transistor 2, and a pole S of the third switch transistor 2 is connected to a pole S of the third switch transistor 4;

the poles D of the first switch transistor 3, the first switch transistor 4, the second switch transistor 3, the second switch transistor 4, the third switch transistor 3, and the third switch transistor 4 are connected to a neutral wire N;

a negative pole of the additional first capacitor is connected to the neutral wire N, and a positive pole of the first capacitor is connected to an output positive pole of the power factor correction circuit;

a positive pole of the additional second capacitor is connected to the neutral wire N, and a negative pole of the second capacitor is connected to an output negative pole of the power factor correction circuit;

anodes of the first diode 1, the first diode 3, the second diode 1, the second diode 3, the third diode 1, and the third diode 3 are connected to the output positive pole of the power factor correction circuit; and cathodes of the first diode 2, the first diode 4, the second diode 2, the second diode 4, the third diode 2, and the third diode 4 are connected to the output negative pole of the power factor correction circuit.

3. The three-phase interleave converter with a three-state switching cell according to claim 2, wherein:

the star connection comprises first capacitors 7, 8 and 9; and, one end of each of the first capacitors 7, 8 and 9 is connected to one of
  a joint between the second common mode inductor and the first inductor,
  a joint between the second common mode inductor and the second inductor, and
  a joint between the second common mode inductor and the third inductor, and the other ends of the first capacitors 7, 8 and 9 are connected together and connected to one end of the second capacitor 7; and the other end of the second capacitor 7 is connected to the neutral wire N.

* * * * *